(12) United States Patent
Hilton

(10) Patent No.: US 8,509,101 B2
(45) Date of Patent: *Aug. 13, 2013

(54) SYSTEMS AND METHODS FOR A CONFIGURABLE COMMUNICATION DEVICE

(75) Inventor: Andrew Hilton, North Vancouver (CA)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/578,814

(22) Filed: Oct. 14, 2009

(65) Prior Publication Data

US 2011/0085468 A1  Apr. 14, 2011

(51) Int. Cl.
H04L 12/26  (2006.01)

(52) U.S. Cl.
USPC ............................... 370/252; 380/277; 726/3

(58) Field of Classification Search
None
See application file for complete search history.

(56) References Cited

U.S. PATENT DOCUMENTS

| | | | |
|---|---|---|---|
| 5,185,860 A | 2/1993 | Wu | |
| 7,043,541 B1 | 5/2006 | Bechtolscheim | |
| 7,085,938 B1 | 8/2006 | Pozzuoli | |
| 7,187,709 B1 | 3/2007 | Menon | |
| 7,360,954 B1 | 4/2008 | Seaver | |
| 2002/0156920 A1 | 10/2002 | Conrad | |
| 2003/0046427 A1 | 3/2003 | Goringe | |
| 2004/0025010 A1 | 2/2004 | Azema | |
| 2004/0071389 A1* | 4/2004 | Hofmeister et al. | 385/16 |
| 2004/0131014 A1 | 7/2004 | Thompson | |
| 2005/0049976 A1* | 3/2005 | Yang | 705/67 |
| 2005/0149651 A1* | 7/2005 | Doak et al. | 710/52 |
| 2005/0240775 A1 | 10/2005 | Chan | |
| 2005/0265717 A1* | 12/2005 | Zhou | 398/9 |
| 2006/0025018 A1 | 2/2006 | Dube | |
| 2006/0277346 A1 | 12/2006 | Doak | |
| 2007/0258715 A1 | 11/2007 | Androni | |
| 2007/0294496 A1 | 12/2007 | Goss | |
| 2008/0039060 A1* | 2/2008 | Fischer | 455/414.4 |
| 2008/0104584 A1 | 5/2008 | Murata | |
| 2008/0109822 A1 | 5/2008 | Chokshi | |
| 2009/0070447 A1 | 3/2009 | Jubinville | |
| 2009/0228982 A1 | 9/2009 | Kobayashi | |

OTHER PUBLICATIONS

PCT/US2010/050966, Patent Cooperation Treaty, International Search Report and Written Opinion of the International Searching Authority, Nov. 26, 2010.

PCT/US2010/050908, Patent Cooperation Treaty, International Search Report and Written Opinion of the International Searching Authority, Nov. 24, 2010.

(Continued)

*Primary Examiner* — Brian Roberts
(74) *Attorney, Agent, or Firm* — Jared L. Cherry

(57) ABSTRACT

The present disclosure relates to systems and methods for configuring a communication device based, at least in part, on a small form-factor pluggable (SFP) transceiver. An SFP transceiver may be utilized in connection with a communication device that transmits data according to a variety of communication protocols. In various embodiments, the configuration may be based upon an SFP configuration value stored in a machine-readable storage medium in the SFP transceiver. In certain embodiments, the SFP configuration value may be an input, together with other values associated with the SFP transceiver and a secret key, to an algorithm for generating a license entitlement key. Certain embodiments may allow for the configuration of a communication device and/or distribution of license entitlement keys in the field.

18 Claims, 3 Drawing Sheets

(56) References Cited

OTHER PUBLICATIONS

PCT/US2010/050918, Patent Cooperation Treaty, International Search Report and Written Opinion of the International Searching Authority, Feb. 8, 2011.
David T. Stott, Avaya Labs Research, Avaya Inc., Layer-2 Path Discovery Using Spanning Tree MIBs, Mar. 7, 2002.
D. Levi, J. Schoenwaelder, Tu Braunschweig, RFC 3165—Definitions of Managed Objects for the Delegation of Management Scripts, <http://tools.ietf.org/html/rfc3165#section-7.1> Aug. 2001.
Adtran, ATLAS 830, Integrated Access Device, Sep. 2003.
A. Bierman, K. Jones, RFC2922—Physical Topology MIB, <http://www.faqs/org/rfcs/rfc2922.html>, Sep. 2000.
Suman Pandey, Mu-Jung Choi, Sung-Joo Lee, James W. Hong, IP Network Topology Discovery Using SNMP, Science and Engineering, POSTECH, Korea, Jan. 20, 2009.
Kenneth C. Behrendt, Michael J. Dood, Substation Relay Data and Communication, Oct. 1995.
E.O. Schweitzer III, Gary W. Scheer, David Dolezilek, Comparison of SEL-2020 Star Network to Shared Networks, Nov. 1999.
Douglas Proudfoot, Dave Taylor, How to Turn a Substation into a Database Server, Apr. 1999.

* cited by examiner

SYSTEMS AND METHODS FOR A CONFIGURABLE COMMUNICATION DEVICE

TECHNICAL FIELD

The present disclosure relates to systems and methods for a configurable communication device. More particularly, the present disclosure relates to a communication device that is configurable based, at least in part, upon a small form-factor pluggable transceiver.

DETAILED DESCRIPTION OF PREFERRED EMBODIMENTS

Figure 1:
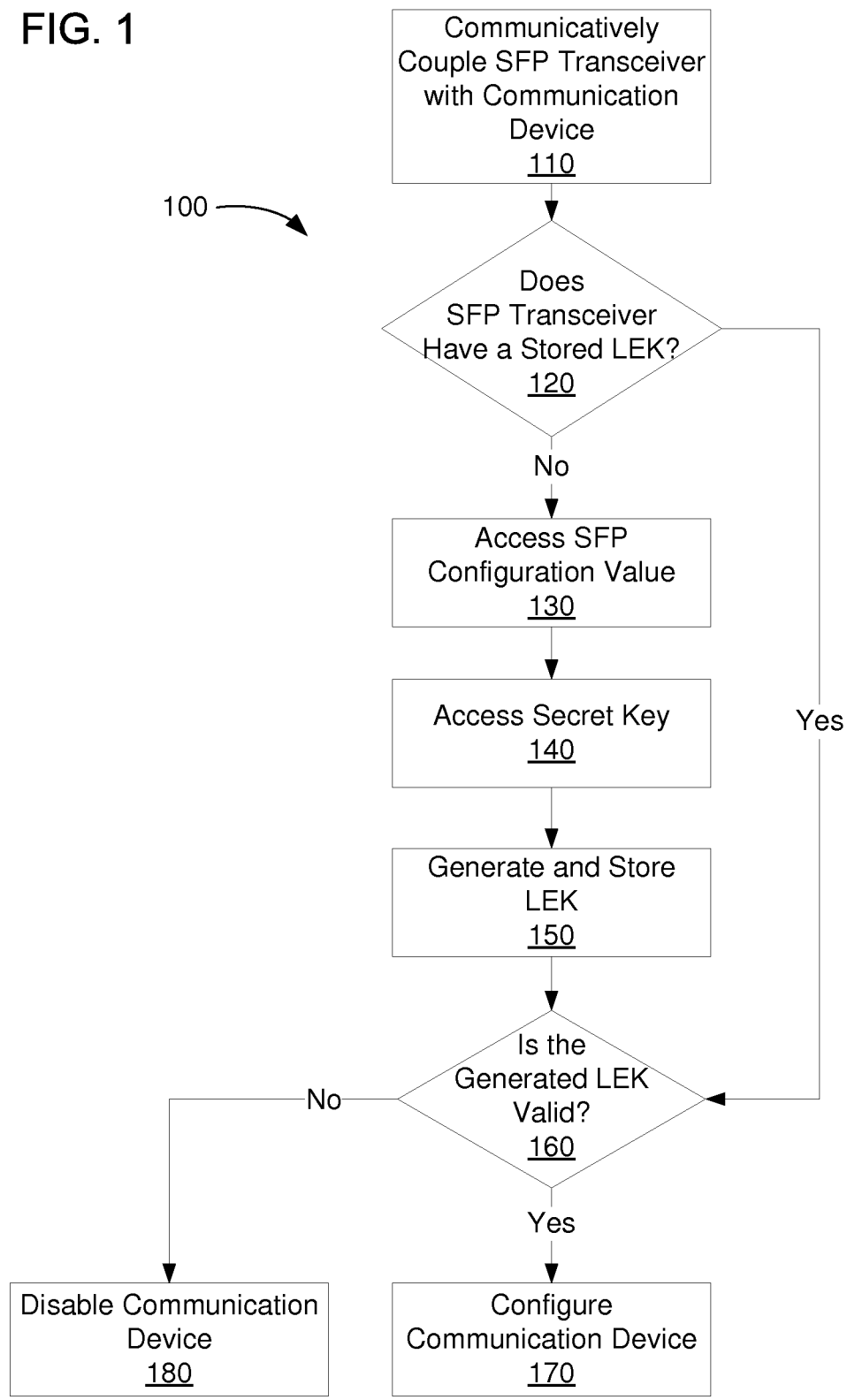
FIG. 1 illustrates a flow chart of one embodiment of a method for configuring a communication device.

Disclosed herein are systems and methods for configuring a communication device based, at least in part, upon a small form-factor pluggable (SFP) transceiver. An SFP transceiver may be utilized in connection with a communication device that transmits data according to a variety of communication protocols. In various embodiments, the configuration may be based upon an SFP configuration value stored in a machine-readable storage medium in the SFP transceiver. In certain embodiments, the SFP configuration value may be an input, together with one or more values associated with the SFP transceiver and a secret key, to an algorithm for generating a license entitlement key. The secret key may be stored in the communication device, and may be stored in such a manner so to not be externally readable. Certain embodiments may allow for the configuration of a communication device and/or distribution of license entitlement keys in the field and without the use of a license server, Internet connection, dial-up connection and/or a USB dongle. Such embodiments may advantageously allow for devices to be upgraded and reconfigured in place and may thus reduce downtime and expense associated with the upgrade.

In certain embodiments, configuration settings may be tied to a generated license entitlement key. In one embodiment, based on a first value of the generated license entitlement key, a communication device may be configured to operate as an Ethernet switch, while based on a second value of the generated license entitlement key, the communication device may be configured to operate as a multiplexer in a synchronized optical network (SONET). Such embodiments may provide a convenient and transparent system for an end user to upgrade the communication device that combines the task of license management and device configuration. Further, such embodiments may facilitate the process of upgrading from one communication standard to another. In other embodiments, configuration settings may be independent of a license entitlement key. For example, a configuration setting may be stored in a machine-readable storage medium, or may be based upon a detected hardware parameter of an SFP transceiver.

An SFP transceiver is a hot-pluggable transceiver, which may be used for both telecommunication and data communications applications. SFP transceivers may be configured to interface a communication device (e.g., a switch or a router) to a fiber optic or copper networking cable. SFP transceivers may be designed to support communications according to a variety of communication protocols and standards, including SONET, Ethernet, Fibre Channel, synchronous digital hierarchy (SDH), and the like. An SFP transceiver may also be configured to comply with various standards, including the SFP+ standard and the XFP standard. It will be understood that in any instance where an SFP transceiver is received herein, an SFP+ transceiver or an XFP transceiver may also be utilized.

An SFP transceiver may comply with a multi-source agreement (MSA), which ensures the interchangeability of SFP transceivers from different vendors. An SFP transceiver may comply with one or more MSAs, including SFP-8472 digital diagnostic monitor interface (DMI). This allows the SFP transceiver to monitor its various signal levels. It also provides information about the configuration of the SFP transceiver. The DMI interface provides access to two databases, namely an A0 database and an A2 database, which can be read via an I2C interface. The A0 database may contain vendor specific information, while the A2 database contains SFP transceiver parameters and user configuration data.

SFP transceivers are available with a variety of different transmitter and receiver types, allowing users to select the appropriate transceiver for each link to provide the required optical reach over the available optical fiber type (e.g., multi-mode fiber or single-mode fiber). SFP transceivers are also available with a copper cable interface, allowing a communication device designed primarily for optical fiber communications to also communicate over an unshielded twisted pair networking cable.

Several aspects of the embodiments described below will be illustrated as software modules or components. As used herein, a software module or component may include any type of computer instruction or computer executable code located within a memory storage device. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory storage device, which together implement the described functionality of the module. Indeed, a module or component may comprise a single instruction or many instructions, and may be distributed over several different code segments, among different programs, and across several memory storage devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory storage device, or across several memory storage devices, and may be linked together in fields of a record in a database across a network.

Embodiments may be provided as a computer program product including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory storage devices, or other types of media/machine-readable storage medium suitable for storing electronic instructions.

Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

FIG. 1 illustrates a flow chart of one embodiment of a method 100 for configuring a communication device. At step 110, an SFP transceiver is communicatively coupled with a communication device. The communication device may be of any type of device that is configured to receive an SFP transceiver. For example, the communication device may be configurable as either an Ethernet switch, or a SONET multiplexer. The communication device may also communicate according to different communication protocols. Similarly, the SFP transceiver may be configured to communicate according to a variety of different communication protocols, line rates, link lengths, and transmission media.

The SFP transceiver may be communicatively coupled to the communication device by way of a communication link. The communication link may comply with the SFP Transceiver Multi-Source Agreement (MSA). An SFP transceiver may also comply with other multi-source agreements, such as XFP, SFP+, and the like.

In certain embodiments, once the SFP transceiver is in communication with the communication device, the communication device may determine whether the SFP transceiver has a stored license entitlement key (LEK) 120. If a stored LEK exists, method 100 may proceed to step 160. If a stored license entitlement key does not exist, method 100 proceeds to step 130. In other embodiments not relying on a license entitlement key, various steps of method 100, including step 120, may be omitted. In addition, in embodiments not relying on license entitlement keys, steps 140, 150, and 160 may also be omitted. In such embodiments, method 100 for configuring a communication device comprises communicatively coupling an SFP transceiver with the communication device 110, accessing an SFP configuration value 130, and configuring the communication device 170.

At step 130, an SFP configuration value may be accessed 130. In certain embodiments, an SFP transceiver may include a machine-readable storage medium, which may contain the SFP configuration value. In other embodiments, the SFP configuration value may be tied to a particular hardware value or other value associated with the SFP. In certain embodiments, a unique SFP configuration value may be assigned to each SFP transceiver.

According to some embodiments, a secret key may be accessed 140 for use in generating the LEK. In certain embodiments, the secret key is included within a processor or a field-programmable gate array (FPGA) in the communication device. Certain processors or FPGAs may include internal values that are not readable external to the processor or FPGA. In certain embodiments, the secret key is stored such that it is not readable external to the processor or FPGA. In this way, the secrecy of the secret key may be enhanced. In other embodiments, the secret key may be stored in other locations and in a variety of forms of machine-readable media. In one embodiment, the secret key may be stored in an encrypted external flash memory, such as the Numonyx Krypto security technologies available from Numonyx B.V., of Rolle, Switzerland.

Using the secret key and the SFP configuration value, an LEK may be generated and stored 150. In one embodiment, the generated LEK may be the output of a hash algorithm, which utilizes as inputs the SFP configuration value and the secret key. The hash algorithm may include secure hash algorithms (SHA), including SHA-0, SHA-1, SHA-2. In alternative embodiments, other hash functions or data algorithms may be utilized. The output of the hash algorithm may be utilized as a license entitlement key. In various embodiments, further manipulation may be performed on the output of the hash algorithm in order to generate the license entitlement key. Once the license entitlement key has been generated, it may be stored. In certain embodiments, the license entitlement key may be stored in a machine-readable storage medium within the SFP transceiver. In one embodiment, the secret key and the SFP configuration value are used as inputs to an SHA-1 algorithm. The output of the SHA-1 is a 20 byte long value, and constitutes the LEK. The LEK may then be stored into a machine-readable storage medium in the SFP transceiver.

After generating the LEK, method 100 may then determine whether the generated LEK is valid 160. A variety of techniques may be utilized to validate the LEK. In various embodiments, a database of valid license entitlement keys may be stored in a machine-readable storage medium in the SFP transceiver or stored in a machine-readable storage medium in the communication device. The generated LEK may be compared to the database of valid license entitlement keys. In still other embodiments, a license server, a USB authentication fob, a smart card, or other authentication technique may be employed. If the generated LEK is not found by one of the above-listed techniques, the LEK may be determined to be invalid. Upon determining that the LEK is not valid, method 100 may disable the communication device 180. In this manner, a measure of security may be introduced to ensure proper licensing.

At step 170 the communication device may be configured, either based on the SFP configuration value and/or based on a license associated with the generated LEK. For example, a configuration setting may be associated with a particular license, and based on the configuration setting, the communication device may be reconfigured. In one embodiment, the configuration setting may comprise a setting of an FPGA. The configuration setting may cause the FPGA to select from a plurality of configuration files. For example, one configuration file may configure the FPGA to process Ethernet communications, while another configuration file may configure the FPGA to process communications according to a different protocol, such as SONET or SDH. A configuration file may be provided for each of the various communications protocols compatible with an SFP transceiver.

Figure 2:
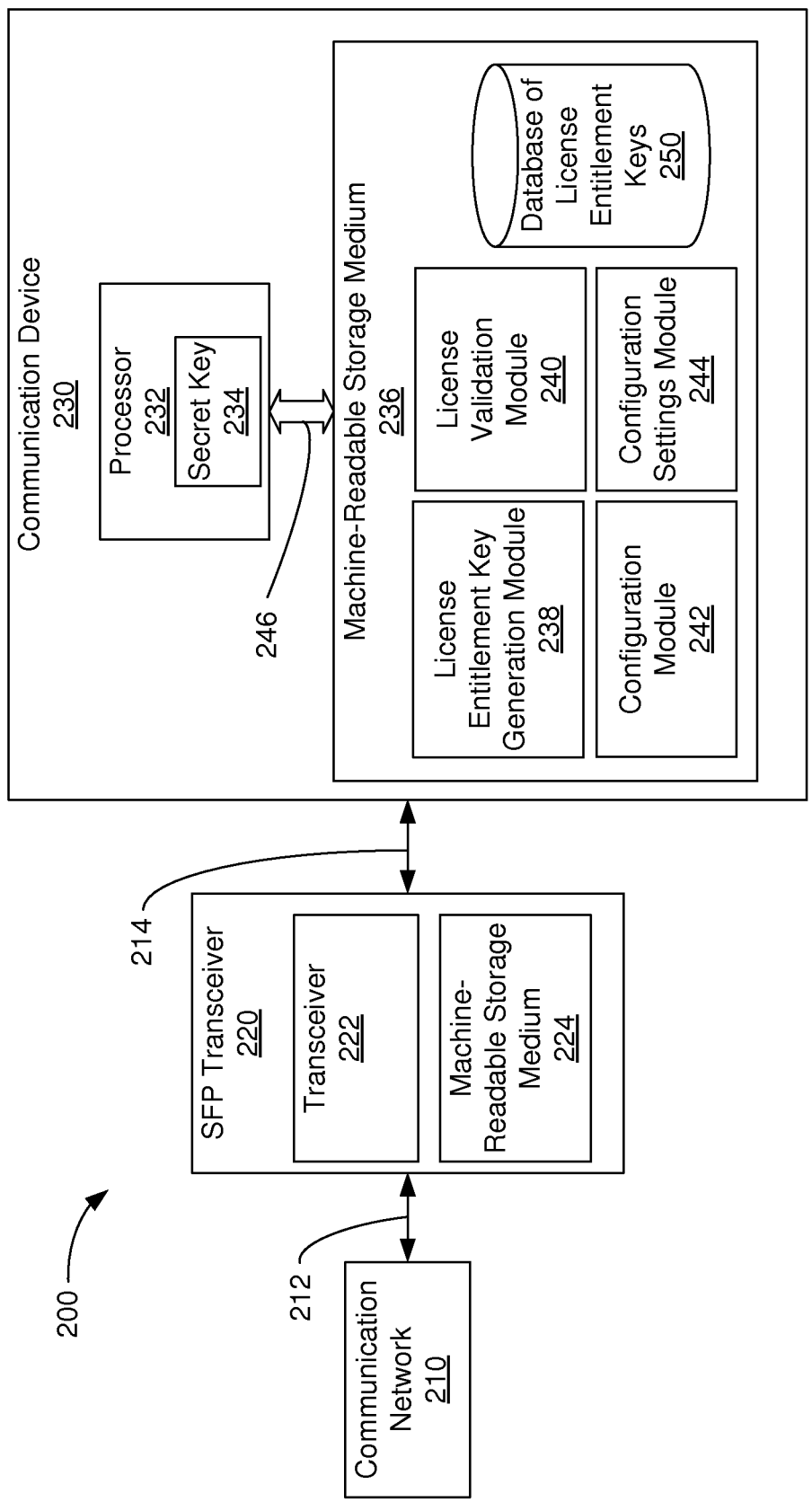
FIG. 2 illustrates a functional block diagram of a system including a configurable communication device.

FIG. 2 illustrates one embodiment of a functional block diagram of a system 200 for configuring a communication device. As illustrated in FIG. 2, a communication network 210 is in communication with an SFP transceiver 220 via a communication link 212. A transceiver 222 may be configured to send and receive data via communication link 212 to communication network 210. Communication link 212 may include a variety of transmission media, including fiber optic or electrical cable. SFP transceiver 220 may be configured to communicate with communication network 210 in a variety of protocols and line speeds, including SONET (e.g., OC-1, OC-3, OC-12, OC-24, OC-48, OC 192), SDH (e.g., STM-1, STM-4, STM-16 and STM-64), and Ethernet (e.g., 100BASE-T, 100BASE-FX, 100BASE-SX, 100BASE-BX, 1000BASE-X, 1000BASE-T, and 1000BASE-CX).

SFP transceiver 220 includes a machine-readable storage medium 224. As illustrated in greater detail in FIG. 3 and discussed in greater detail below, machine-readable storage medium 224 may include a variety of types of information, including an SFP configuration value, and other types of information, such as a serial number, an identifier of a manufacturer, information regarding the type of the SFP transceiver, and the like. SFP transceiver 220 may be communicatively coupled via an SFP transceiver communication link 214 to a communication device 230. Link 214 may comprise an I2C interface. Each of communication device 230 and SFP transceiver 220 may comprise a port or an interface to create link 214.

SFP transceiver 220 is in communication with communication device 230 by way of an SFP communication link 214. Communication device 230 may include a processor 232. Processor 232 may operate using any number of processing rates, architectures, and may be embodied as a general purpose processor, an application specific processor, a field-programmable gate array, or other programmable device. Processor 232 may be configured to perform various algorithms and calculations described herein. In certain embodiments, including the illustrated embodiment of FIG. 2, a secret key 234 is stored within processor 232. In certain embodiments, secret key 234 may not be readable outside of processor 232, and accordingly, the secrecy of secret key 234 may be enhanced. Certain FPGA devices may allow for such secret values to be maintained within the FPGA. In other embodiments, secret key 234 may be stored in other locations.

A data bus 246 may provide a communication link between processor 232 and a machine-readable storage medium 236. Machine-readable storage medium 236 may be implemented using a variety of technologies, including hard drives, floppy diskettes, RAM, solid-state memory storage devices, and other storage media suitable for storing electronic instructions and other data. Certain embodiments may be provided as a computer program product including a machine-readable storage medium having stored instructions thereon that may be used to program a computer (or other electronic device) to perform processes described herein.

Machine-readable storage medium 236 may be the repository of software modules or other machine-readable instructions that are executable by processor 232. In particular, machine-readable storage medium 236 may store a license entitlement key generation module 238, a license validation module 240, a configuration module 242, configuration settings module 244, and a database of license entitlement keys 250.

License entitlement key generation module 238 may perform a method for generating a license entitlement key. In one embodiment, license entitlement key generation module 238 comprises a secure hash algorithm, which may utilize values stored in machine-readable storage medium 224 and secret key 234 to generate an output digest.

License validation module 240 may be operable to validate the license entitlement key generated by license entitlement key generation module 238. In one embodiment, a valid license entitlement key (not shown) is maintained in machine-readable storage medium 224. In certain embodiments, machine-readable storage medium 224 comprises only a single valid license entitlement key, which is specific to SFP transceiver 220. The license entitlement key generated by license entitlement key generation module 238 may be compared to the valid license entitlement key stored in machine-readable medium 224 in order to assess the validity of the generated license entitlement key.

In other embodiments, license validation module 240 may be configured to operate in conjunction with a database of license entitlement keys 250 stored on machine-readable storage medium 236. In some embodiments, database of license entitlement keys 250 may be encrypted so as to protect against unauthorized access to the database of license entitlement keys 250. In alternative embodiments, database of license entitlement keys 250 may be remote to communication device 230, and various techniques may be utilized to validate a license entitlement key (e.g., a license server, a USB authentication fob, a smart card, and the like).

Configuration module 242 may configure communication device 230 based upon the SFP configuration value and/or the license corresponding to a valid license entitlement key. Various configuration settings may be stored in configuration settings module 244. In one embodiment, the configuration setting may comprise one or more settings of an FPGA, in embodiments where processor 232 comprises an FPGA. For example, the configuration setting may cause the FPGA to select from a plurality of configuration files, which may be stored in configuration settings module 244. One configuration file may configure the FPGA in a mode to process Ethernet communications, while another configuration file may configure the FPGA in another mode to process communications according to a different protocol, such as SONET.

Figure 3:
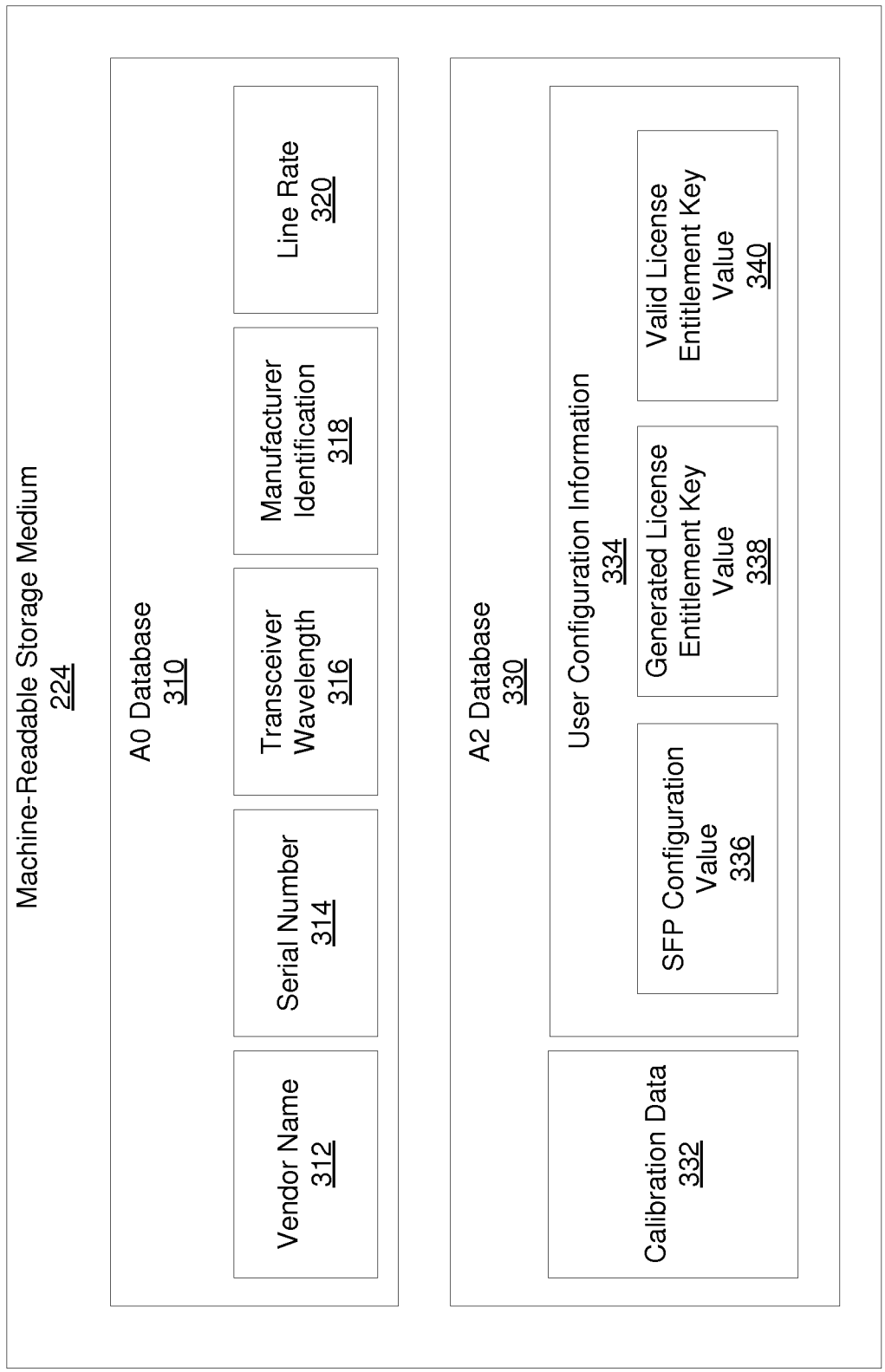
FIG. 3 illustrates a block diagram of one embodiment of a machine-readable storage medium, which may be comprised within an SFP transceiver.

FIG. 3 illustrates one embodiment of machine-readable storage medium 224, which may be comprised within an SFP transceiver. Machine-readable storage medium 224 comprises two databases, an A0 database 310, and an A2 database 330. Various data may be stored in A0 database 310, including a vendor name 312, a serial number 314, a transceiver wavelength 316, a manufacturer identification 318, and a line rate 320. In certain embodiments, A0 database 310 may comprise read-only memory. A2 database 330 may comprise both read and write accessible memory and read-only memory. In a memory location for calibration data 332, various data may be recorded relating to the calibration of the SFP transceiver.

An SFP configuration value 336, a generated license entitlement key value 338, and a valid license entitlement key value 340 may be stored in a memory location for user configuration information 334. In certain embodiments, the SFP configuration value 336 and/or the valid license entitlement key value 340 may be stored in read-only memory.

As discussed in connection with FIGS. 1 and 2, above, SFP configuration value 336 may be utilized to select a configuration setting or may be a value that is utilized as an input to an algorithm for generating a license entitlement key. Similarly, various values from A0 database 310 may also be used as inputs to the configuration setting or to the algorithm for generating a license entitlement key. The generated license entitlement key value may be compared to the valid license entitlement key value 340 in order to validate the generated license entitlement key. Once generated, a license entitlement key may be stored in the memory location for a generated license entitlement key value 338. By storing a generated license entitlement key, a system can validate the license entitlement key when the system is activated without requiring that the license entitlement key be generated again.

It will be obvious to those having skill in the art that many changes may be made to the details of the above-described embodiments without departing from the underlying principles of the present disclosure. The scope of the present invention should, therefore, be determined only by the following claims.

The invention claimed is:

1. A configurable communication system comprising:
   a small form-factor pluggable (SFP) transceiver comprising,
     an SFP configuration value,
     a device communication port, and
     a network communication port configured to communicatively couple the SFP transceiver to a network; and
   a communication device configurable in at least one of a first mode and a second mode based on a license entitlement key, the communication device comprising,
     a processor,
     a secret key,
     an SFP transceiver interface configured to communicatively couple the SFP transceiver to the communication device,
     a first machine-readable storage medium comprising,
       a configuration module executable by the processor, the configuration module configured to select a configuration setting based at least in part on the SFP configuration value,
       a license entitlement key generation module executable on the processor and configured to generate a license entitlement key based on the SFP configuration value and the secret key;
   wherein upon communicatively coupling the SFP transceiver to the communication device, the license entitlement key generation module generates the license entitlement key and the configuration module configures the communication device in one of the first mode and the second mode based on the generated license entitlement key, and
   wherein the communication device is configured in the first mode to process communications received via the network communication port according to a first communications protocol and is configured in the second mode to process communications received via the network communication port according to a second communications protocol.

2. The system of claim 1, wherein the first communications protocol comprises Ethernet, and the second communications protocol comprises at least one of synchronized optical networking (SONET) and synchronous digital hierarchy (SDH).

3. The system of claim 1, wherein the network communications port is configured to communicate using at least one of 100BASE-T, 100BASE-FX, 100BASE-SX, 100BASE-BX, 1000BASE-X, 1000BASE-T, and 1000BASE-CX.

4. The system of claim 1, wherein the network communications port is configured to communicate using at least one of OC-1, OC-3, OC-12, OC-24, OC-48, OC 192, STM-1, STM-4, STM-16 and STM-64.

5. The system of claim 1, wherein the processor comprises a field-programmable gate array (FPGA), and wherein a configuration setting of the FPGA is selected based at least in part on the SFP configuration value.

6. The system of claim 5, wherein the configuration setting in the first mode configures the FPGA to process Ethernet communications, and the configuration setting in a second mode configures the FPGA to process synchronized optical network communications.

7. The system of claim 1, wherein the SFP transceiver comprises a second machine-readable storage medium, and wherein the SFP configuration value comprises a value stored on the second machine-readable storage medium.

8. The system of claim 7, wherein the value stored on the second machine-readable storage medium comprises at least one of an identifier of a manufacturer of the SFP transceiver and a serial number of the SFP transceiver.

9. The system of claim 1, wherein the configuration value comprises a hardware value of the SFP transceiver.

10. The system of claim 1, wherein the SFP transceiver communication interface comprises an I2C interface.

11. The system of claim 1, wherein the communication device is configured to operate as an Ethernet switch in the first mode and is configured to operate as a SONET multiplexor in the second mode.

12. A method for configuring a communication device, the method comprising:
    communicatively coupling a small form-factor pluggable (SFP) transceiver with a communication device, the SFP transceiver comprising a network communication port configured to communicatively couple the SFP transceiver to a network;
    accessing an SFP configuration value stored on the SFP transceiver;
    accessing a secret key stored on the communication device;
    generating a license entitlement key using the SFP configuration value and the secret key using a license entitlement key generation module operating on the communication device;
    configuring the communication device in one of the first mode and the second mode based on the license entitlement key; and
    processing communications received via the network communication port according to a first communications protocol in the first mode and according to a second communications protocol in the second mode.

13. The method of claim 12, wherein the first communications protocol comprises Ethernet, and the second communications protocol comprises at least one of synchronized optical networking (SONET) and synchronous digital hierarchy (SDH).

14. The method of claim 12, further comprising:
    selecting a configuration setting based at least in part on the SFP configuration value;
    wherein the configuration setting comprises a setting of a field-programmable gate array (FPGA).

15. The method of claim 14, wherein configuring the communication device comprises selecting code executable on the FPGA based at least in part on the SFP configuration value.

16. The method of claim 12, further comprising configuring the communication device to operate as a synchronized optical network multiplexer in the first mode.

17. The method of claim 12, further comprising configuring the communication device to operate as an Ethernet switch in the second mode.

18. A communication device configured to receive a small form-factor pluggable (SFP) transceiver, the SFP transceiver comprising an SFP configuration value, the communication device comprising:
    a processor;
    a secret key,
    an SFP transceiver interface configured to communicatively couple the SFP transceiver to the communication device; and
    a first machine-readable storage medium comprising,
      a configuration module executable by the processor, the configuration module configured to select a configuration setting of the communication device based at least in part on the SFP configuration value, a license entitlement key generation module executable on the processor and configured to generate a license entitlement key based on the SFP configuration value and the secret key;

wherein upon communicatively coupling the SFP transceiver to the communication device, the license entitlement key generation module generates the license entitlement key and the configuration module configures the communication device in one of the first mode and the second mode based on the generated license entitlement key, wherein the communication device is configured in the first mode to process communications received via a network communication port according to a first communications protocol and is configured in the second mode to process communications received via the network communication port according to a second communications protocol.

* * * * *